United States Patent
Dimou et al.

(10) Patent No.: US 8,515,415 B2
(45) Date of Patent: Aug. 20, 2013

(54) HANDLING RADIO LINK FAILURE IN A RADIO COMMUNICATIONS NETWORK

(75) Inventors: Konstantinos Dimou, Stockholm (SE); Magnus Lindstråm, Spånga (SE); Wei Zhao, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 217 days.

(21) Appl. No.: 12/977,875

(22) Filed: Dec. 23, 2010

(65) Prior Publication Data

US 2011/0207485 A1 Aug. 25, 2011

Related U.S. Application Data

(60) Provisional application No. 61/306,757, filed on Feb. 22, 2010.

(51) Int. Cl.
*H04W 24/00* (2009.01)

(52) U.S. Cl.
USPC .......................................... 455/423; 455/436

(58) Field of Classification Search
None
See application file for complete search history.

(56) References Cited

U.S. PATENT DOCUMENTS

| 2007/0032237 A1* | 2/2007 | Chang et al. .................. 455/436 |
| 2008/0008212 A1* | 1/2008 | Wang et al. ................... 370/503 |
| 2009/0046573 A1* | 2/2009 | Damnjanovic ............... 370/216 |

OTHER PUBLICATIONS

3rd Generation Partnership Project, RAN3 (source), "LS on RLF Recovery Information over X2," 3GPP TSG RAN WG2 Meeting #61bis, R2-081426_R3-080553, Shenzhen, CN, Mar. 31-Apr. 4, 2008.
3rd Generation Partnership Project, Ericsson (source), "Detection of RLF," 3GPP TSG-RAN WG2 Meeting #63, R2-084048, Jeju Island, South Korea, Aug. 18-22, 2008.
3rd Generation Partnership Project, Nokia (source), " Report on [65.9]: Email Discussion for Handling of RLC UM Error and Ciphering Issue During CS-HSPA," 3GPP TSG-RAN WG2 Meeting #65bis, R2-092199, Seoul, South Korea, Mar. 23-27, 2009.
3rd Generation Partnership Project, "Technical Specification Group Radio Access Network; Evolved Universal Terrestrial Radio Access (E-UTRA); Physical Layer Procedures (Release 9)," 3GPP TS 36.213 v9.0.1, Sophia Antipolis Valbonne, FR, Dec. 17, 2009.
3rd Generation Partnership Project, Catt (source) "Considerations on Radio Link Failure in CA," 3GPP TSG RAN WG2 Meeting #67bis, R2-095482, Miyazaki, JP, Oct. 12-16, 2009.
Alcatel-Lucent, et al., "4C-HSDPA Radio Link Failure Enhancement," 3GPP TSG-RAN WG1 Meeting #69bis R2-102058, Apr. 12-16, 2010, pp. 1-3, Beijing, China.
Catt, "RLF Report Definition Based on MRO Stage-2 Solution," 3GPP TSG-RAN WG3 Meeting #66, R3-092843, Nov. 9-13, 2009, pp. 1-7, Jeju, Korea.
Huawei, "RLF in Enhanced Cell_FACH," 3GPP TSG-RAN WG2 Meeting #62, R2-082287, May 5-9, 2008, pp. 1-2, Kansas City, US.
Nokia Siemens Networks, "UE-Originated RLF Reports for Correct RLF Reason Detection," 3GPP TSG-RAN WG3 Meeting #65bis, R3-092501, Oct. 12-15, 2009, pp. 1-3, Miyazaki, Japan.
Nokia Siemens Networks, et al., "UE-Originated RLF Report for SON," 3GPP TSG-RAN WG2 Meeting #68bis, R2-100248, Jan. 18-22, 2010, pp. 1-4, Valencia, Spain.
NTT Docomo, Inc., "RLF Detection," 3GPP TSG-RAN WG2 #64, R2-086746, Nov. 10-14, 2008, pp. 1-8, Prague Czech Republic.

* cited by examiner

*Primary Examiner* — German Viana Di Prisco
(74) *Attorney, Agent, or Firm* — Coats & Bennett, P.L.L.C.

(57) ABSTRACT

Embodiments herein relate to a method in a user equipment for handling a radio link failure in a radio communications network. The user equipment is served in a first cell controlled by a radio base station. The radio base station is comprised in the radio communications network, The user equipment detects a first indication of a failure of a radio link between the user equipment and the radio base station. The user equipment then transmits a second indication of radio link failure to the radio base station when the first indication is detected.

14 Claims, 9 Drawing Sheets

HANDLING RADIO LINK FAILURE IN A RADIO COMMUNICATIONS NETWORK

RELATED APPLICATIONS

This application claims priority to U.S. Provisional Application Ser. No. 61/306,757, filed Feb. 22, 2010 and incorporated by reference herein in its entirety.

TECHNICAL FIELD

Embodiments herein relate to a user equipment, a radio base station and methods therein. In particular, embodiments herein relate to enable the user equipment to establish a connection in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA) system, Global System for Mobile communications/Enhanced Data rate for GSM Evolution (GSM/EDGE), Worldwide Interoperability for Microwave Access (WiMax), or Ultra Mobile Broadband (UMB), just to mention a few. A radio communications network comprises radio base stations providing radio coverage over at least one respective geographical area forming a cell. User Equipments (UE) in those cells are served by respective radio base stations and are communicating with those respective radio base stations. The user equipments transmit data over an air interface to the radio base stations in uplink (UL) transmissions and the radio base stations transmit data to the user equipments in downlink (DL) transmissions. When a user equipment moves from one cell to another the connection or link of the user equipment must be transferred in a so called handover (HO) process. Within for example LTE a reuse of frequencies between cells is used, similar to WCDMA-based systems. However, in LTE soft HO of a user equipment between cells is not a part of the standard specifications and instead hard HO of the user equipment between cells is adopted. Soft handover means that the user equipment is connected to both the cells simultaneously during the handover procedure. Hard handover means that a link to a source cell is released and then a link to the target cell is established. However, hard handover is a procedure which might experience failures such as Radio Link Failures (RLF).

Typical scenarios where RLFs might occur more often are the so called i) "high-speed train" and ii) "Manhattan" scenarios. A high speed train scenario is when a user equipment is moving fast between cells and a Manhattan scenario is when the user equipment is moving between a high number of cells due to a corner effect. A corner effect means that the user equipment may be served in one cell and when going around a corner a different cell may be in line of sight and the served cell may not have radio coverage around the corner leading to a very abrupt cell change. In order to combat RLFs, within present versions of LTE, such as Release 8 and beyond, a mechanism which permits the user equipment to recover from RLF has been defined.

The mechanism is termed "RLF recovery" within 3GPP and comprises a process wherein a radio link failure occurs during a handover at a time instance and the procedure to recover involves acquiring synchronization with the cellular system again. The synchronization requires a certain time to be performed. After that, the user equipment selects a best cell in terms of measuring signal strength such as Reference Signal Received Power (RSRP) or Reference Signal Received Power Quality (RSRQ) which are processes to indicate signal strength of reference signals. This also requires some time interval to be performed. The user equipment then performs a random access procedure also requiring some time. The random access procedure is performed in order to establish a connection. Finally, the user equipment performs a Radio Resource Control (RRC) Connection Reestablishment Request and receives a RRC Connection Reestablishment Complete response indicating connection reestablished.

A slow RLF recovery implies a long interruption time. The duration of the whole radio link failure recovery is dictated by a timer. In case the user equipment does not receive an acknowledgement (ACK) such as an RRC Connection Reconfiguration Request ACK message from the network within a time duration defined by the timer, then the RLF recovery procedure is determined to have failed and the user equipment goes from an active mode back to an idle mode. In this case, the RRC connection is lost and the user equipment needs to establish a new RRC connection. Simulations have shown that in these challenging mobility scenarios, the whole procedure lasts 500-600 ms for 90% of the cases.

The time duration for performing the RRC connection reestablishment may increase the interruption time. Prior art solutions describe scenarios where the cell that receives the RRC Connection Reestablishment Request message contacts the last serving cell of the user equipment in discussion here. This is a feasible option since the RRC Connection Reestablishment Request message includes the temporary cell id of its last serving cell. This range of solutions is termed within 3GPP as "UE context-fetching" solutions. Prior art solutions are solutions for maintaining the RRC connection, since the RLF recovery procedure is successful within the time specified by the timer ruling this procedure. However, prior art solutions imply that the interruption time remains at a high level; as the cell where the UE has landed during RLF recovery has to communicate with the last serving cell of the UE and fetch its context. This procedure of fetching the user equipment context involves communication via X2, which requires some time. For non-delay critical services, this might generate problems in the Transmission Control Protocol (TCP) execution and for delay-critical services, this interruption time is perceived by the user equipment and may be perceived as annoying by a user of the user equipment.

SUMMARY

An object of embodiments herein is to improve the performance of a user equipment within a radio communications network.

According to an aspect of embodiments herein the object is achieved by a method in a user equipment for handling a radio link failure in a radio communications network. The user equipment is served in a first cell controlled by a radio base station and the radio base station is comprised in the radio communications network. The user equipment detects a first indication of a failure of a radio link between the user equipment and the radio base station. The user equipment transmits a second indication of radio link failure to the radio base station when the first indication of a failure is detected.

According to another aspect of embodiments herein the object is achieved by a user equipment for handling a radio link failure in a radio communications network. The user equipment is served in a first cell controlled by a radio base station. The radio base station is comprised in the radio communications network. The user equipment comprises a detecting circuit configured to detect a first indication of a failure of a radio link between the user equipment and the radio base station. The user equipment further comprises a transmitter configured to transmit a second indication of a radio link failure to the radio base station when the first indication is detected.

According to another aspect of embodiments herein the object is achieved by a method in a radio base station for enabling a user equipment to establish a connection in a radio communications network. The user equipment is served in a first cell controlled by the radio base station. The radio base station is comprised in the radio communications network. The radio base station detects a failure of a radio link between the user equipment and the radio base station by receiving a second indication from the user equipment indicating a radio link failure detected at the user equipment. The radio base station detects the failure by additionally testing the radio link by transmitting a message to the user equipment and comparing whether a response is received from the user equipment within a second time value. If the second time value expires the failure is detected. The radio base station further forwards a user equipment context of the user equipment to a circuitry controlling a second cell when the failure is detected. The user equipment context enables the circuitry controlling the second cell to serve the user equipment. Thereby the user equipment is enabled to establish the connection in the radio communications network.

According to another aspect of embodiments herein the object is achieved by a radio base station for enabling a user equipment to establish a connection in a radio communications network. The user equipment is served in a first cell controlled by the radio base station. The radio base station comprises a detecting circuit configured to detect a failure of a radio link between the user equipment and the radio base station by receiving a second indication from the user equipment indicating a radio link failure detected at the user equipment. The detecting circuit comprises a testing circuit configured to test the radio link by transmitting a message to the user equipment and comparing whether a response is received from the user equipment within a second time value. If the second time value expires the failure is detected. The radio base station further comprises a forwarding circuit configured to forward a user equipment context of the user equipment to a circuitry controlling a second cell when the failure is detected. The user equipment context enables the circuitry controlling the second cell to serve the user equipment enabling the user equipment to establish the connection in the radio communications network.

Embodiments herein imply a faster RLF recovery reducing interruption times to low values as the user equipment informs the radio base station of a possible radio link failure, that is, the second indication of a failure. The radio base station may then forward the user equipment context to the circuitry controlling the second cell or cells. The user equipment context is thereby present in the circuitry of the second cell at an establishment request from the user equipment, and the interruption time is reduced. As the interruption time is reduced the performance of the user equipment is improved.

BRIEF DESCRIPTION OF THE DRAWINGS

Embodiments will now be described in more detail in relation to the enclosed drawings, in which.

DETAILED DESCRIPTION

Figure 1:
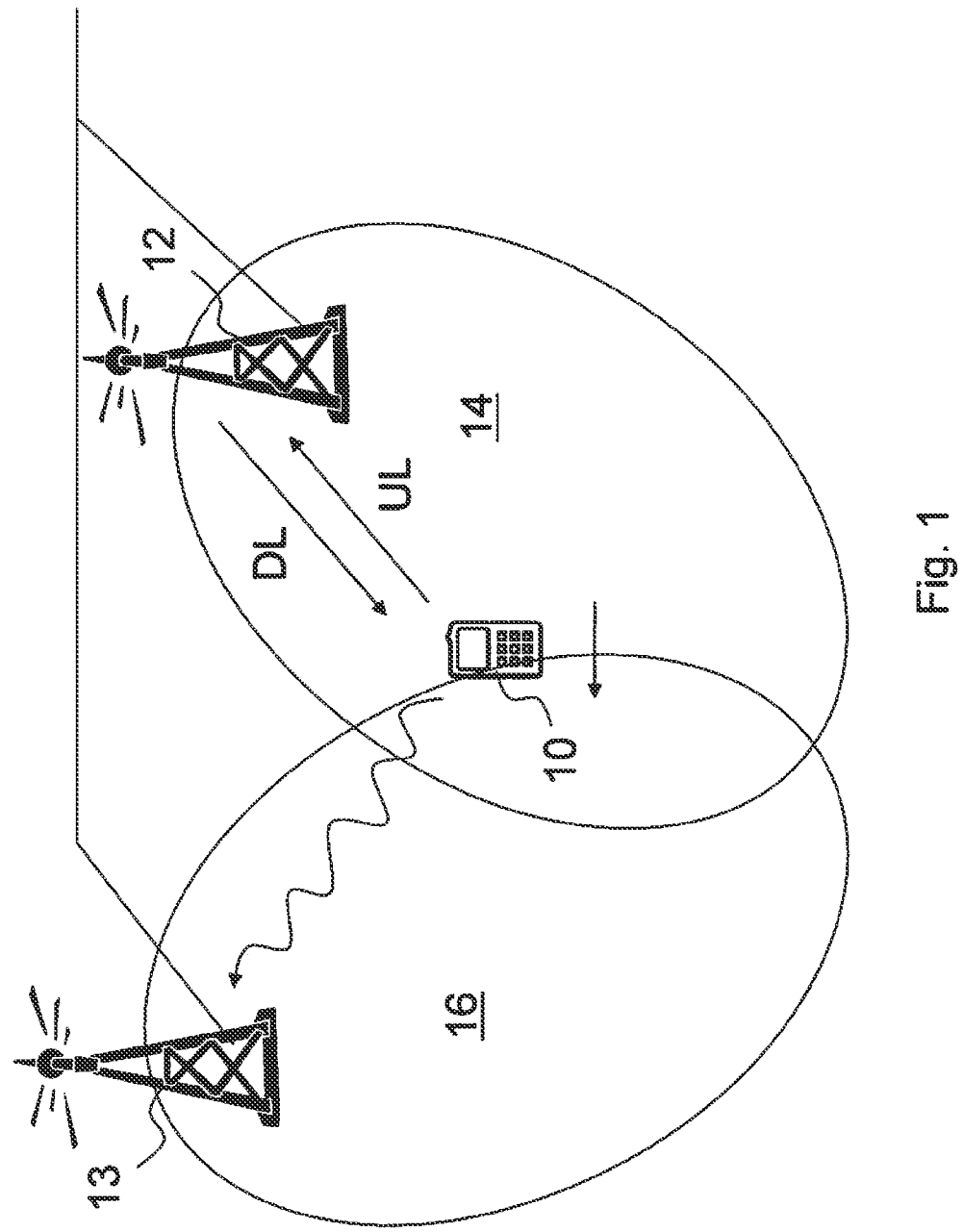
FIG. 1 is a block diagram depicting a radio communications network.

FIG. 1 is a block diagram depicting a radio communications network such as Long Term Evolution (LTE), LTE-Advanced, 3rd Generation Partnership Project (3GPP) Wideband Code Division Multiple Access (WCDMA) system, Time Division Synchronous Code Division Multiple Access (TD-SCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few.

A user equipment 10 is comprised in the radio communications network. The user equipment 10 is served in a first cell 14 controlled by a first radio base station 12. The user equipment 10 is moving towards a second cell 16 controlled by a second radio base station 13. The radio base stations 12, 13 provide radio coverage within a geographical area forming respective cell 14, 16. The first user equipment 10 in the first cell 14 is communicating with the first radio base station 12 in an uplink (UL) transmission when data is transmitted to the first radio base station 12 and in a downlink (DL) transmission when data is sent to the first user equipment 10 from the first radio base station 12.

The user equipment 10 may e.g. be represented by a wireless communication terminal, a mobile cellular phone, a Personal Digital Assistant (PDA), a legacy user equipment, a wireless platform, a laptop, a computer or any other kind of device capable to communicate wirelessly with the radio base stations 12, 13.

The respective radio base station 12, 13 may also be referred to as e.g. a NodeB, an evolved Node B (eNB, eNode B), a base transceiver station, Access Point Base Station, base station router, or any other network unit capable to communicate with a user equipment 10 within the cells 14, 16 served by the respective radio base station 12, 13, depending e.g. of the radio access technology and terminology used.

As stated above the user equipment 10 is moving towards the second cell 16 and it may happen that a Radio Link Failure (RLF) occurs during a handover of the user equipment 10 from the first cell 14 to the second cell 16. Radio link failures may also occur when entering a radio coverage hole or similar situations wherein the user equipment 10 loses a connection, to the network.

According to embodiments herein the first radio base station 12 detects that a radio link failure has occurred. This is detected by receiving an indication, also referred to herein as a second indication, from the user equipment 10.

When the first radio base station 12 has detected that the radio link failure has occurred, the first radio base station 12 forwards a user equipment context of the user equipment 10 to a circuitry in the second radio base station 13. The circuitry controls the second cell 16. The circuitry may comprise hardware and/or software within the radio base station 13 and be configured to provide radio coverage over the second cell 16.

It should here be noted that the first radio base station 12 may serve the second cell 16 and comprise the circuitry that controls the second cell 16.

The user equipment context may comprise user subscription information such as radio bearers established, Quality of Service (QoS) and transport parameters, security context, handover restriction and/or similar user equipment data. Also, the user equipment context enables the circuitry controlling the second cell 16 to serve the user equipment 10. Thus, by forwarding the user equipment context to the circuitry controlling the second cell 16 the user equipment context is already present at the circuitry when the user equipment 10 tries to connect to the second cell 16.

Thus, the first radio base station 12 detects the RLF at the user equipment 10 by receiving a second indication from the user equipment 10 that the user equipment 10 is very likely going to declare RLF. Such a second indication may e.g. be one or more Random Access Channel (RACH) attempts after the user equipment 10 has detected RLF or a specific appositely defined Channel Quality Indicator (CQI) value. The RACH attempt may use the existing preambles, or new defined preambles for that purpose. A preamble is a bit sequence used for identifying a transmission. In order to provide this second indication, the user equipment 10 may monitor each radio link, may also be referred as a connection, connected to the first radio base station 12.

Thus, upon detection of RLF, the first radio base station 12 forwards the user equipment context to, for example, N neighbor cells. In case the first radio base station 12 has received a measurement report by the user equipment 10 for which RLF is detected, the first radio base station 12 may forward this user equipment context to a target cell e.g. the second cell 16 indicated by the measurement report plus N-1 cells. Otherwise, these neighbor cells may be cells indicated by previous mobility measurements to and from the first cell 14, or cells having signaled high other cell interference from the first radio base station 12; i.e. the cells to which the user equipment context is forwarded do not need to be all of the neighbor cells.

Embodiments herein describe a combination of use of tools in the user equipment 10 so as to track RLF in a way that the complexity of the user equipment 10 is not increasing considerably. The RLF is detected by the second indication from the user equipment 10 and thereby the user equipment aids the first radio base station 12 to detect the RLF in an efficient manner. The second indication is transmitted from the user equipment 10 only upon fulfilment of one or more criteria of the radio link, i.e. detecting a first indication of a possible RLF, such first indication may be signal quality indicating that the radio link has deteriorated, traffic activity may be below expected value, and/or out of synchronization indication, also referred to as a third indication, has been received.

As the user equipment context is forwarded and thereby already available at the second cell 16 to which the user equipment 10 transmits a RRC Connection Reestablishment Request message, the overall time duration of the RLF recovery procedure is significantly reduced.

Figure 2:
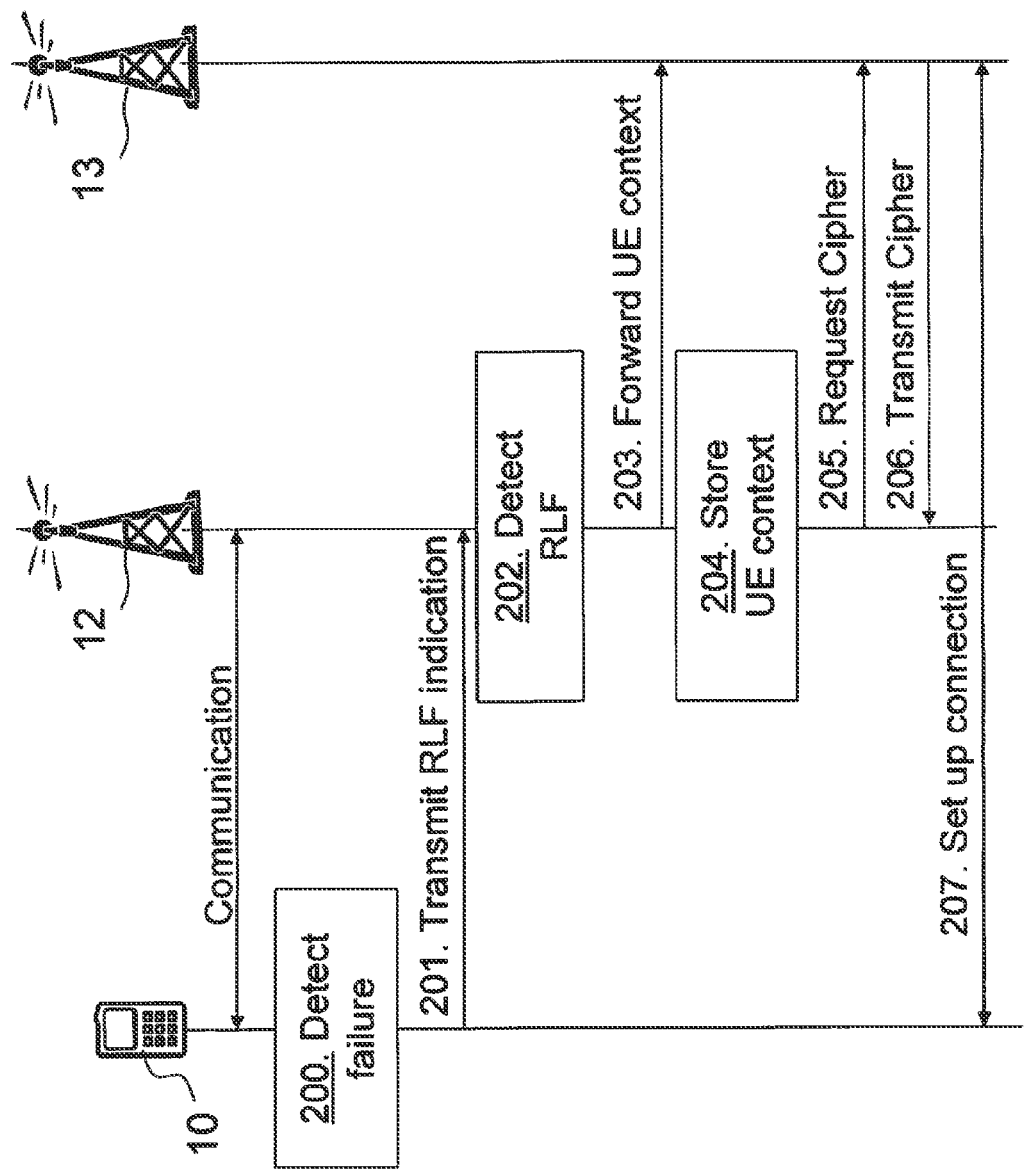
FIG. 2 is a combined schematic flowchart and signalling scheme in a radio communications network.

FIG. 2 is a combined flowchart and signaling scheme in a radio communications network. The flowchart and signaling scheme enables the user equipment 10 to establish or re-establish a connection in the radio communications network after a radio link failure in an efficient and quick manner. The user equipment 10 is served in the first cell 14, which is controlled by the first radio base station 12. The first radio base station 12 is comprised in the radio communications network. The user equipment 10 is connected over a connection or radio link to the first radio base station 12 as indicated by the arrow denoted as communication.

Step 200. The user equipment 10 determines that a possible radio link failure of the radio link has occurred by detecting the first indication of a failure of a radio link between the user equipment 10 and the radio base station 12. For example, the user equipment 10 may monitor channel quality and traffic activity to determine whether a radio link failure has possibly occurred. The user equipment 10 may additionally or alternatively determine that a possible radio link failure has occurred when the user equipment 10 receives a significantly out of synchronization indication in a DL synchronization procedure from the first radio base station 12. Significantly out of synchronization means that a time difference to the instant of perfect time synchronization is higher than a maximum time offset that is observed within the cell.

Step 201. The user equipment 10 then transmits the second indication or notification of a radio link failure to the first radio base station 12. Thus, the user equipment 10 transmits the second indication to the last serving radio base station.

Step 202. The first radio base station 12 then detects that a radio link failure has occurred when receiving the second indication of a radio link failure from the user equipment 10 and from monitoring the radio link. That is, the radio base station 12 may in some embodiments poll the user equipment 10 after receiving the second indication to test whether a radio link failure has really occurred.

Step 203. The first radio base station 12 then forwards a user equipment context of the user equipment 10 to at least one cell, e.g. the cell with the strongest reported signal. Thus, the user equipment context is present at the at least one cell when the user equipment 10 tries to establish a connection to a circuitry controlling the at least one cell.

An additional scenario is when the user equipment 10 recovers in a given cell, e.g. the second cell 16, after RLF, receives its user equipment context in the second cell 16, but then the user equipment 10 returns back to its previous serving cell, e.g. first cell 14, the one before the RLF detection. The user equipment 10 may also, while returning back to its previous serving cell, the first cell 14, detect another RLF. This may be the case where a first RLF is detected when the user equipment 10 is about to do a ping-pong HO, then a second RLF is detected when the user equipment 10 is trying to return back to the first cell 14 in an effort to correct its previous decision. A ping pong handover means that handover between cells 14,16 are repeated back and forth.

In this case the user equipment 10 ends up in the first cell 14, where the user equipment context is not available anymore, as the user equipment context has been forwarded to the circuit controlling or serving the second cell 16. Consequently, the first radio base station 12 needs to fetch the user equipment context again. Or, even worse, the user equipment 10 detects a RLF when transmitting a handover confirm message to a new service level. In this case the user equipment context is not available in the second cell 16 where the user equipment 10 detects the RLF, as the second radio base station 13 has not fetched the user equipment context yet. In case the user equipment 10 tries to recover from RLF in another third cell or in the first cell 14, those radio base stations controlling the cells cannot fetch the user equipment context since the last serving cell, the second cell 16, is not in possession of the user equipment context. These cases may mainly occur when the user equipment 10 declares RLF during a ping-pong HO and refer to a non-successful execution of the ping-pong HO. In order to combat those cases and the case when the ping-pong HO is triggered and is successfully executed, the following is provided.

Step 204. In some embodiments wherein the user equipment context is forwarded to the circuitry controlling the second cell 16, the target cell, or to circuitries controlling N neighbour cells, either during successful HO execution or during user equipment context forwarding upon detection of RLF at the first radio base station 12 according to embodiments herein, the user equipment context of this user equipment 10 may be stored in the first radio base station 12 for a given time period, referred to herein as a third time value T3, which is defined by a store timer Timer_3.

If it is estimated that this storing of the user equipment context in the first radio base station 12 may lead to unnecessary loading of the first radio base station 12, then the first radio base station 12 may store this user equipment context only when aggressive HO triggers are used. The reason is that the suggested method intends to provide a solution for the case where ping-pong HOs occur and those ones happen typically when aggressive HO triggers are used. Aggressive handover triggers are defined as triggers with relative short time thresholds to be used during handovers.

Hence, the storing of the user equipment context may occur only when conditions (EQ1) and (EQ2) are satisfied, which are typically indications of aggressive HO triggers:

$$HO\_hysteresis < Threshold\_1 \quad (EQ1)$$

$$TimeToTrigger < Threshold\_2 \quad (EQ2)$$

where
HO_hysterisis defines number of back and forth attempts to perform handover between cells, and
TimeToTrigger defines length of time period to trigger a handover.

The Threshold_1 may be set such that the user equipment context is stored only when the HO hysteresis is not sufficiently large so as to protect from ping-pong handovers. Typical values for Threshold_1 are 3-4 dBs. The Threshold_2 may be set such that the user context is stored only when the time to trigger is not large enough so as to guarantee that no ping-pong handovers occur. Typical Threshold_2 values are 640-1280 ms.

Step 205. In order to be able to make use of the user equipment context at a later stage, the previous serving radio base station, e.g. the first radio base station 12, may have to request for security information such as ciphering keys used in the second cell 16 to which the user equipment 10 is now connected. Therefore, the first radio base station 12 may request this security information from circuitries controlling cells to which the user equipment context is forwarded to, and cells which the first radio base station 12 may detect that the user equipment 10 is connected to. In the illustrated example, the first radio base station 12 requests the ciphering keys from the second radio base station 12 controlling the second cell 16.

Step 206. The second radio base station 13 then transmits the ciphering keys to the first radio base station 12 so that the first radio base station 12 may use the user equipment context.

Step 207. The user equipment 10 and the second radio base station 13 may set up a connection using the user equipment context.

Figure 3:
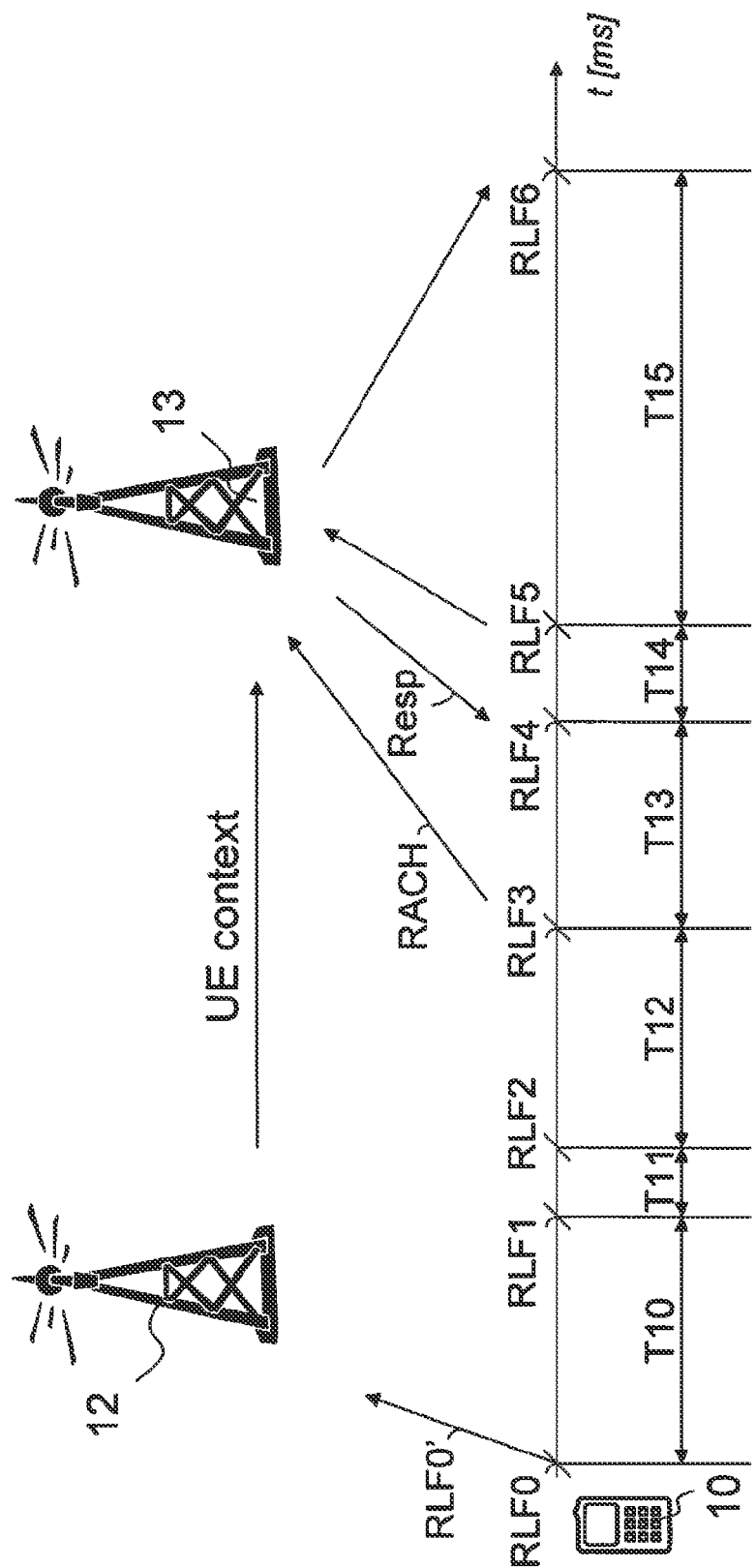
FIG. 3 is a schematic overview of a process during an establishment of a connection.

FIG. 3 is a block diagram depicting an embodiment of a process during a radio link failure in a radio communications network. A radio link failure may occur in different processes such as before, during or after a handover between different cells, an occurrence of coverage hole in the radio communication network or similar. A coverage hole is an area within the radio coverage of the radio communications network in which a signal level is below a design threshold. The coverage hole is usually caused by physical obstructions such as buildings, foliage, hills, tunnels and indoor parking garages.

Step RLF0. The user equipment 10 detects the first indication of a failure of the radio link between the user equipment 10 and the first radio base station 12 has occurred.

In some embodiments, the user equipment 10 tracks channel quality of the radio link. When the channel quality is below a threshold the user equipment 10 may initiate a monitoring of a traffic activity over the radio link. From the traffic activity the user equipment 10 may determine that the first indication that a radio link failure may possibly have occurred has been detected. When this is determined the user equipment 10 may transmit a Channel Quality Indicator (CQI) with a specific value. The specific value may be 0 or '−1' and the first radio base station 12 may then know that a possible RLF has occurred by reading the specific value of the received CQI. The first radio base station 12 may have stored the specific value previously or the specific value may be preconfigured at the first radio base station 12.

In some embodiments the user equipment 10 may alternatively or additionally detect that the user equipment 10 is not synchronized to the radio communications network indicating a radio link failure. For example, the user equipment 10 may receive a number of consecutive out of synchronization (sync) indications and does not receive an in synchronization indication during a pre-set time interval. An out of synchronization indication may be when the radio link quality, such as Signal to Interference plus Noise Ratio (SINR) or similar, drops below a low threshold value for synchronization and an in-synchronization indication may be when the radio link quality is above a high threshold value for synchronization. The low threshold value may be lower than or equal to the high threshold value.

In some embodiments, the user equipment 10 may detect an out of synchronization indication over a physical downlink control channel (PDCCH) from the first radio base station 12, similarly to the out of synchronization indications discussed above. The user equipment 10 may have stored some timing information and then the user equipment 10 may attempt a random access procedure on a Random Access Channel (RACH), as indicated by the arrow RLF0'. Thereby the first radio base station 12 may be informed that the random access request is coming from a user equipment that is "about to die" or get disconnected. That is, the first radio base station 12 may detect that a radio link failure has probably occurred when receiving the random access request, which is probably severely non-synchronized to a radio network clock. Severely here means that random access request is out of synchronization with a time difference larger than a time advance value the first cell 14 supports. In these embodiments the first radio base station 12 may poll the user equipment 10 about to get disconnected by transmitting an uplink scheduling grant to these user equipments. In case no uplink transmission is received at the first radio base station 12, the first radio base station 12 already here forwards the user equipment context to one or more circuitries controlling neighboring cell or cells, e.g. the second cell 16.

Step RLF 1. In some embodiments the user equipment 10, after detecting the first indication of a radio link failure, synchronizes to the radio communications network, which synchronization requires a time to perform the process. A synchronization time interval T10 needed to synchronize to the system is defined as a time between the steps RLF1-RLF0.

Step RLF2. The user equipment 10 may select a best cell in terms measuring signal strength such as Reference Signal Received Power (RSRP) or Reference Signal Received Quality (RSRQ). This may be performed by measuring on a reference signal and identifying the best cell in terms of RSRP or RSRQ respectively. A second time interval T11 needed is defined as a selecting time indicating time between steps RLF2 to the RLF1.

Step RLF3. The user equipment 10 may then initiate a random access procedure to the selected best cell at time instance RLF3 after listening to a Physical Broadcast Channel (P-BCH) and a System Information Broadcast (SIB) channel of the selected best cell. A third time interval T12 needed so as to listen to P-BCH and SIBs is defined as the time between the steps RLF3-RLF2.

Step RLF4. The random access procedure is completed and successful at time instance RLF4. A fourth time interval T13 needed to complete the random access procedure is defined as random access time indicating time between steps RLF4-RLF3.

Step RLF5. The user equipment 10 may transmit a Radio Resource Control (RRC) Connection Reestablishment Request message at time instance RLF5. A fifth time interval T14 needed is defined as the time required for transmitting the RRC connection request message i.e. the time between steps RLF5-RLF4.

Step RLF6. The user equipment 10 may then receive a RRC Connection Reestablishment Complete response from the second radio base station 13 for this request at time instance RLF6. A sixth time interval T15 is needed between the steps RLF6-RLF5.

According to embodiments herein the sixth time interval T15 is minimized by introducing a radio link failure detection mechanism in the user equipment 10 as described above in combination with a forwarding mechanism in the first radio base station 12. Thereby, the first radio base station 12 detects the radio link failure when the second indication from the user equipment 10 is received and from testing the radio link of the user equipment 10. After the radio link failure is detected the first radio base station 12 forwards the user equipment context to one or more circuitries controlling one or more cells. The presence of the user equipment context at the circuitry controlling the second cell 16 reduces the time between the instant the user equipment 10 transmits the RRC Connection Reestablishment Request message and the instant the user equipment 10 receives the response by the network, in the form of a RRC Connection Reestablishment Complete. This sixth time interval T15 depends on whether the user equipment context is available in the cell in which the user equipment 10 has landed after RLF. This delay ranges from tens of milliseconds up to more than 200 of milliseconds today, accounting thus for 10-50% of the overall RLF recovery duration. By forwarding the user equipment context, the user equipment context is available in the first or second cell 14,16 where the user equipment 10 attempts to recover from RLF and the interruption time is minimized.

Figure 4:
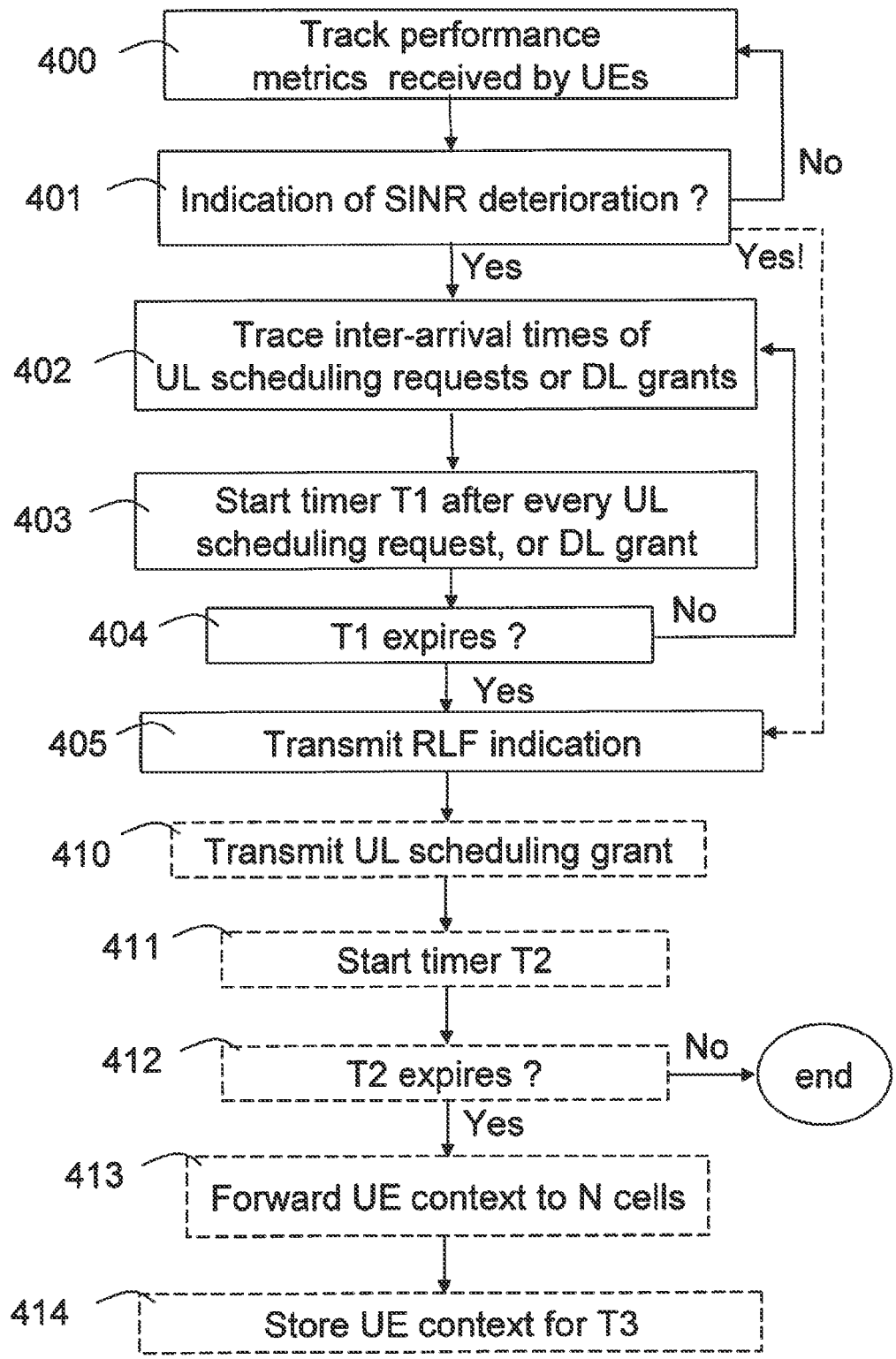
FIG. 4 is a schematic flowchart of embodiments disclosed herein.

FIG. 4 shows embodiments of a method for enabling the user equipment 10 to establish a connection in the radio communications network. The step 400-405 are performed in the user equipment 10 and steps 410-414 are performed in the radio base station 12.

Step 400. In some embodiments herein the user equipment 10 may keep track of a channel quality of the radio link maintained with the first radio base station 12 within the first cell 14. In this respect the user equipment 10 may keep track of performance metrics, such as the DL Channel Quality Indicator (CQI) reports, or of number of Hybrid Automatic Request (HARQ) Non-Acknowledgement (NACKs) sent to the user equipment 10. Thus, the user equipment 10 may track the channel quality of the radio link between the user equipment 10 and the first radio base station 12.

Step 401. The user equipment 10 may then determine whether the radio link is deteriorating indicating a possible upcoming failure of the radio link. For example, in case the above mentioned performance metrics indicate a deterioration of the radio link with the first radio base station 12, for example in case either or both $$\text{avg\_DL\_SINR} < \text{Threshold\_3, and} \qquad (EQ3)$$

$$\text{\#consecutive\_HARQ\_NACKs} > \text{Threshold\_4} \qquad (EQ4)$$

are detected for the radio link to the first radio base station 12, then the user equipment 10 may start monitoring the traffic activity, see the step 402.

avg_DL_SINR defines an average of the Signal to Interference plus Noise Ratio (SINR) in the DL, and #consecutive_HARQ_NACKs defines number of consecutive received HARQ NACKs. The Threshold_3, and Threshold_4 may be preset, adjusted dynamically or updated continuously.

This implies that some averaging of N CQI values, where N defines the number, may be done at the user equipment 10. Considering that this measurement may reflect also the dynamic behavior of the radio link, the reasonable approach is that N is not a high number.

Thus, the user equipment 10 may determine whether the channel quality exceeds one or more upper threshold values and/or is below one or more lower threshold values. If the radio link is not determined to be deteriorated the process may go back to step 400.

In some embodiments, the user equipment 10 detects that the user equipment 10 is very close to detect the first indication of a RLF, the user equipment 10 may then instantaneously indicate the RLF probability to the first radio base station 12 by transmitting a specific CQI as shown with the dashed arrow to step 405.

Step 402. The user equipment 10 may monitor traffic activity over the radio link between the user equipment 10 and the radio base station 12 when the tracked channel quality exceeds the upper threshold value and/or is below the lower threshold value. For example, when at least one out of equations (EQ3) and (EQ4) or a combination of them has been satisfied, the user equipment 10 may start monitoring the traffic activity for the radio link to the first radio base station 12. For example, the user equipment 10 traces an inter-arrival time, $t_{inter}$, of sent scheduling requests and DL or UL scheduling grants received at the user equipment 10. An inter-arrival time is the time interval between received scheduling grants or similar. An average inter-arrival time of scheduling requests or grants, $avg\_t_{inter}$, may be an appropriate indication of the traffic activity for the user equipment 10.

The tracing of activity at a physical layer may be performed only when there is also higher layer protocol layer activity; for both Downlink and Uplink traffic. The physical layer comprises the basic hardware transmission technologies of a network. The user equipment 10 may keep track of higher layer protocol activity. This may be performed by observing data buffers at the user equipment 10 at a Medium Access Control (MAC), Radio link Control (RLC), Packet Data Convergence Protocol (PDCP) and Transmission Control Protocol (TCP) layer. Data buffers storing transmitter's information are used so as to indicate activity in Uplink and the buffers storing receiver's information indicate the activity in Downlink.

Step 403. For the user equipment 10 that monitors the traffic activity, upon reception of a scheduling, UL or DL, grant and/or upon transmission of a scheduling request, the user equipment 10 may start a first timer, denoted as timer_1.

A first time threshold T1 of this first timer may be equal to the average inter-arrival time between scheduling requests or grants plus an additional offset, denoted as offset_1:

$$\text{timer\_1} = \text{avg\_t}_{inter} + \text{offset\_1} \quad (EQ5)$$

The value of offset_1 may be set to a value so that timer_1 has a first time threshold T1 equivalent to a value of a timer detecting RLF in the user equipment 10 specified in the standard document TS 36.331, e.g. timer T310. The first time threshold T1 may be updated when needed.

In some embodiments the the timer_1 is only activated when the user equipment 10 comprises a buffer that is not empty and only when higher layers, e.g. Packet Data Convergence Protocol (PDCP), Transmission Control Protocol (TCP), Hypertext Transfer Protocol (HTTP), indicate that there is traffic activity as stated above.

Step 404. The user equipment 10 may determine whether the first time threshold T1 has expired. If the first time threshold T1 of timer_1 has not expired the radio link is considered to be functional and the process may go back to step 402. If the first time threshold T1 is exceeded the radio link is indicated as failed.

Step 405. Upon expiration of timer_1 the user equipment 10 may transmit a CQI value to the serving first radio base station 12, which value is a specific value indicating that it user equipment 10 is prone to RLF.

The steps below 410-414 are performed in the first radio base station 12 as indicated by the dashed line.

Step 410. Upon reception of the CQI with the specific value indicating RLF the first radio base station 12 may transmit an UL scheduling grant message to the user equipment 10, asking to get, for example, a report on the user equipment buffer size.

Step 411. The first radio base station 12 may then start, upon transmission of the UL scheduling grant, a second timer, denoted as timer_2 that has a second time value T2. T2 may be preset or adjusted to measured statistics.

Step 412. The first radio base station 12 may then determine whether the second timer timer_2 expires before receiving an UL transmission from the user equipment 10.

If the second time value T2 has not expired when receiving the UL transmission the radio link is considered to be functional and the process may end.

Step 413. In case the first radio base station 12 does not receive the UL transmission from the user equipment 10 before T2 expires, then the user equipment context of this user equipment 10 may be forwarded to circuitry or circuitries controlling a number N of neighbour cells, where N may be one or more.

If the user equipment 10 has reported measurements done on reference signals, then very likely in these measurements a best cell in terms of RSRP, or a so-called target cell might have been indicated, such as the second cell 16. The first radio base station 12 may then forward the user equipment context to a circuitry controlling this second cell 16 and maybe to circuitries controlling N-1 other cells. These other cells may be cells indicated by a previous mobility history in the first cell 14. In for example LTE Release 8 the first radio base station 12 may keep track of cells where user equipments, such as the user equipment 10, are handed over. Hence, information on most probable target cells is available.

Another type of information which may be used so as to define the cells to which the user equipment context is to be forwarded is X2 messages on Overload Indications (OI) received by neighbor cells. X2 is a communication interface between radio base stations. Such information is a good indication of some user equipments in the first cell 14 being close to another neighbour cell and creating interference to those neighbour cells.

For instance, in a Manhattan scenario the user equipment 10 almost always ends up in the target cell and the same applies, approximately 80% of the time, in a high speed train scenario. Hence, in some embodiments forwarding to the circuitries controlling the target cell and one more cell may be sufficient. It may happen that all of the cells to which the user equipment context is forwarded are controlled by the same radio base station. In this case, one signalling message via X2 is sufficient.

Step 414: As stated above the first radio base station 12 may store the user equipment context for the third time value T3 seconds defined by the store timer Timer_3 and request the circuitry or circuitries controlling one or more cells to which the user equipment context has been forwarded to send their ciphering keys.

It should here be noted that the user equipment 10 may transmit the second indication to the first radio base station 12 after determining that the channel quality is below a preset threshold as indicated by the dashed lined arrow. Thus, the first radio base station 12 may monitor the traffic activity of the user equipment 10 before testing the radio link.

Figure 5:
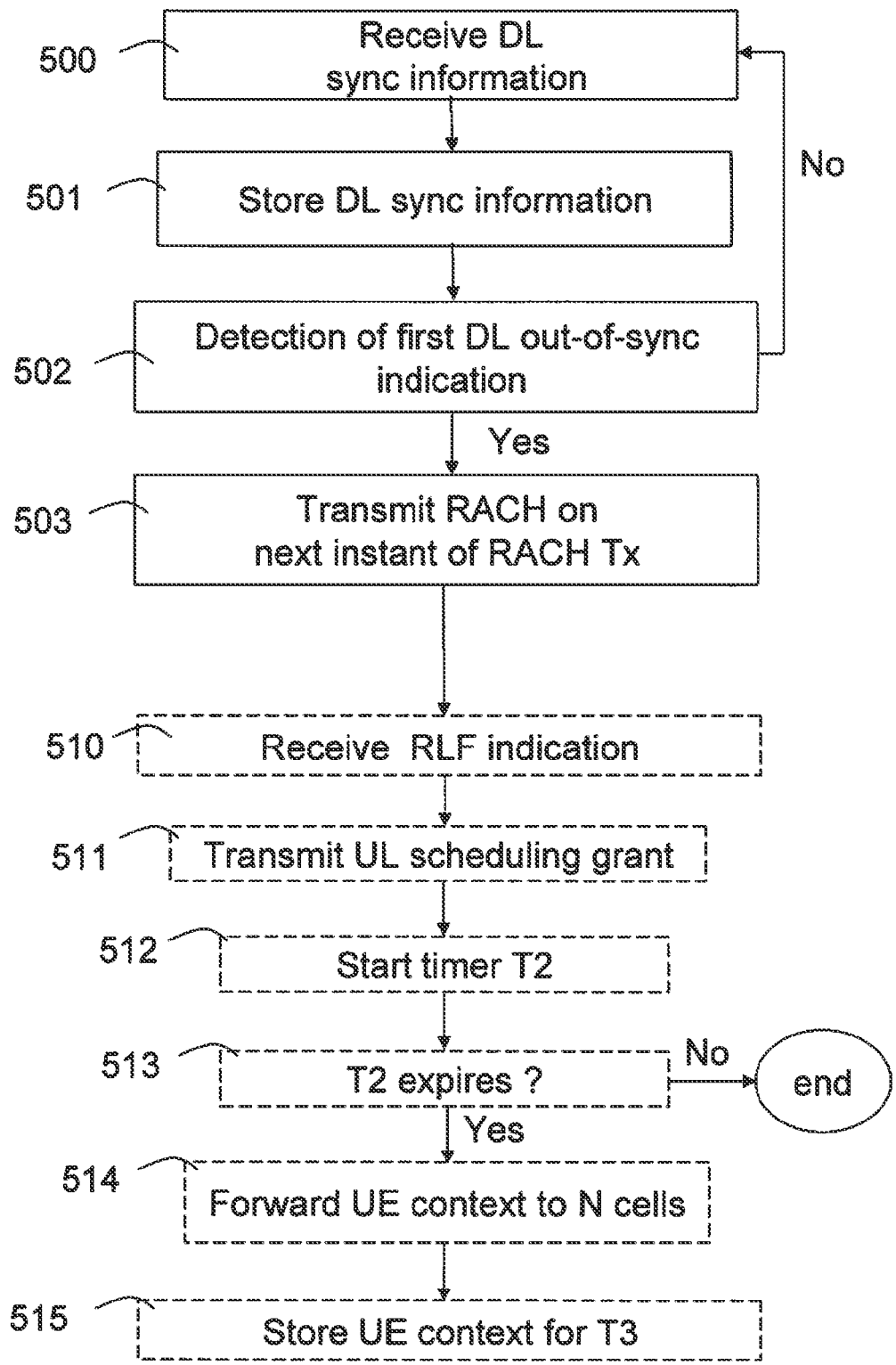
FIG. 5 is a schematic flowchart of embodiments disclosed herein.

FIG. 5 shows embodiments of a method for enabling the user equipment 10 to establish a connection in the radio communications network. The step 500-504 are performed in the user equipment 10 and steps 510-514 are performed in the radio base station 12.

Step 500. The user equipment 10 receives DL PDCCH, Primary Synchronization Signal (PSS), Secondary Synchronization Signal (SSS), and/or other system synchronization information in DL, e.g. on a Broadcast Control Channel (BCCH) from the first radio base station 12.

Step 501. The user equipment 10 may store the radio communications network or cell synchronization information, such as a clock rate or similar.

Step 502. The user equipment 10 checks whether being in synchronization at each Transmission Time Interval (TTI). For example, the user equipment 10 receives a number of consecutive out of synchronization indications or third indications and does not receive an in synchronization indication during a time interval. An out of synchronization indication may be when the radio link quality, such as Signal to Interference plus Noise Ratio (SINR) or similar, drops below a low synchronization threshold value and an in-synchronization indication may be when the radio link quality is above a high synchronization threshold value. The low synchronization threshold may be lower than the high synchronization threshold value.

In some embodiments, the user equipment 10 may detect an out of synchronization indication over a physical downlink control channel (PDCCH) from the first radio base station 12, similarly to the out of synchronization indications discussed above.

If the user equipment 10 determines that it is in synchronization the process may go back to step 500.

Step 503. When the user equipment 10 is out of synchronization the user equipment 10 may transmit a random access request over RACH. The random access may be transmitted at, for example, a time instant evaluated on the basis of the stored radio communications network or cell synchronization information. Thus, the user equipment may attempt instantaneously a random access to the first radio base station 12 using the stored clock.

The steps below 510-514 are performed in the first radio base station 12 as indicated by the dashed line.

Step 510. The first radio base station 12 receives the random access request which may be out of synchronization from the clock in the radio base station 12.

Step 511. Upon reception of a random access request with a large time difference to the instant of exact synchronization, i.e. a time difference larger than a time advance value the first cell 14 supports, then the first radio base station 12 may transmit an UL scheduling grant to the user equipment 10 which is prone to detect soon RLF. The first radio base station 12 is aware of the identity of the user equipment 10 and others in the first cell 14, since the first radio base station 12 monitors active radio links in the first cell 14. The UL scheduling grant message to the user equipment 10, may request, for example, a report on a buffer size of the user equipment 10. Before polling the user equipment 10 the radio base station 12 may monitor channel quality and/or traffic activity of the radio link.

Step 512. The first radio base station 12 may then start a second timer timer_2 that has a second time value T2.

Step 513. The first radio base station 12 may then determine whether the second timer timer_2 expires before receiving an UL transmission from the user equipment 10.

If T2 has not expired when receiving the UL transmission the radio link is considered to be functional and the process ends.

Step 514. In case the first radio base station 12 does not get the UL transmission from the user equipment 10, then the user equipment context of this user equipment 10 is forwarded to a the circuitry or circuitries controlling N neighbour cells, where N may be one or more.

If the user equipment 10 has reported measurements done on reference signals, then very likely in these measurements a best cell in terms of RSRP, or a so-called target cell might have been indicated, such as the second cell 16. The first radio base station 12 may then forward the user equipment context to a circuitry controlling this second cell 16 and maybe to N-1 circuitries of other cells. These other cells may be the ones indicated by a previous mobility history in the first cell 14. In for example LTE Release 8 the first radio base station 12 may keep track of cells where user equipments such as the user equipment 10 are handed over. Hence, information on most probable target cells is available.

Another type of information which may be used so as to define the cells to which the user equipment context is to be forwarded is X2 messages on Overload Indications (OI) received by neighbor cells. X2 is a communication interface between radio base stations. Such information is a good indication of some user equipments in the first cell 14 being close to another neighbour cell and creating interference to those neighbour cells.

For instance, in a Manhattan scenario the user equipment 10 almost always ends up in the target cell and the same applies, approximately 80% of the time, in a high speed train scenario. Hence, in some embodiments forwarding to the circuitry controlling the target cell and 1 more circuitry controlling another cell is sufficient. It may happen that all of the cells to which the user equipment context is forwarded are controlled by the same radio base station. In this case, one signalling message via X2 is sufficient.

Step 515: As stated above the first radio base station 12 may store the user equipment context for the third time value T3 seconds defined by the store timer Timer_3 and request the one or more cells, i.e. circuitries controlling the one or more cells, to which the user equipment context has been forwarded to send their ciphering keys.

Figure 6:
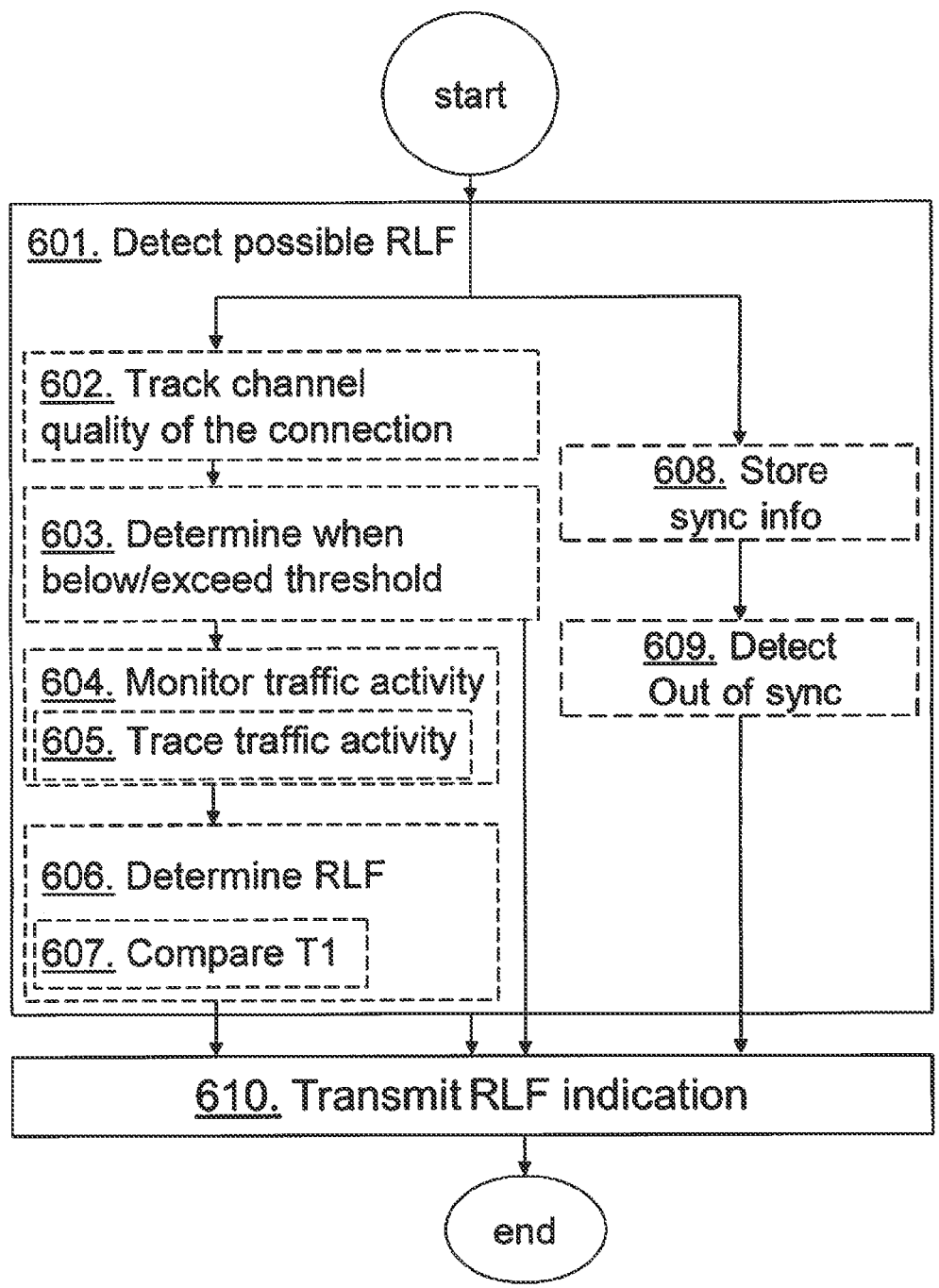
FIG. 6 is a schematic flowchart of a method in a radio communications network.

The method steps in the user equipment 10 for handling radio link failure in the radio communications network according to some general embodiments will now be described with reference to a flowchart depicted in FIG. 6. The steps do not have to be taken in the order stated below, but may be taken in any suitable order. The user equipment 10 is served in a first cell 14 controlled by a radio base station 12 and the radio base station 12 is comprised in the radio communications network.

Step 601. The user equipment 10 detects a first indication of a failure of the radio link between the user equipment 10 and the radio base station 12.

Step 602. The user equipment 10 may in some embodiments as indicated by the dashed line track a channel quality of the radio link. For example, the user equipment 10 may keep track of performance metrics of the radio link.

Step 603. The user equipment 10 may in some embodiments as indicated by the dashed line determine whether the channel quality exceeds an upper threshold value and/or is below a lower threshold value.

In some embodiments, the user equipment 10 tracks the channel quality of the radio link and determines that the first indication of a failure is detected when the tracked channel quality exceeds an upper threshold value and/or is below a lower threshold value.

Step 604. The user equipment 10 may in some embodiments as indicated by the dashed line monitor a traffic activity over the radio link when the tracked channel quality exceeds the upper threshold value and/or is below the lower threshold value.

Step 605. The user equipment 10 may in some embodiments as indicated by the dashed line trace a time between receiving or transmitting a first scheduling message and receiving or transmitting a second scheduling message. For example, the user equipment 10 may trace the time between a transmission of a scheduling request and reception of a scheduling grant, UL or DL.

Step 606. The user equipment 10 may in some embodiments as indicated by the dashed line determine that the first indication of a failure of the radio link is detected when traffic activity falls below an activity threshold, and there is data buffered or protocol activity in the user equipment 10 for the radio base station 12.

Step 607. The user equipment 10 may in some embodiments as indicated by the dashed line compare the traced time with a first time threshold (T1) to determine that the first indication of a failure of the radio link is detected. Thus, the user equipment 10 transmits, see step 610, the second indication to the radio base station 12 when the traced time exceeds the first time threshold (T1).

The first time threshold (T1) may comprise an average time between previous consecutive received scheduling messages or previous consecutive transmitted scheduling messages, and a time offset. For example, an average inter-arrival time of scheduling requests or grants, $\text{avg\_t}_{inter}$, may be an appropriate indication of the traffic activity for the user equipment 10. The time offset may be set to a value so that the first time threshold T1 is equivalent to the value of timer T310 in TS 36.331.

Step 608. In some embodiments as indicated by the dashed line, the user equipment 10 may store a clock time of radio communications network. For example, the user equipment 10 may store the clock transmitted from the radio base station 12.

Step 609. In some embodiments as indicated by the dashed line, the user equipment 10 may receive a third indication that the user equipment 10 is out of synchronization with the radio communications network. Then, the second indication of radio link failure in step 610 below may comprise a random access channel request. The random access request may be transmitted as the user equipment 10 detects the third indication that the user equipment 10 is out of synchronization. The second indication may be transmitted by using the stored clock time.

Step 610. The user equipment 10 transmits the second indication of radio link failure to the radio base station 12 when the first indication of a failure is detected, which second indication may be used as a trigger to forward a user equipment context to a circuitry 131 controlling a second cell 16. The circuitry 131 may comprise hardware and/or software within a radio base station configured to provide radio coverage over the second cell 16. It should here be noted that the radio base station 12 may serve the first cell 14 as well as the second cell 16 and comprise the circuitry that controls the second cell 16.

The user equipment context enables the circuitry 131 controlling the second cell 16 to serve the user equipment 10 wherein the user equipment context is used when establishing the connection in the radio communications network.

Figure 7:
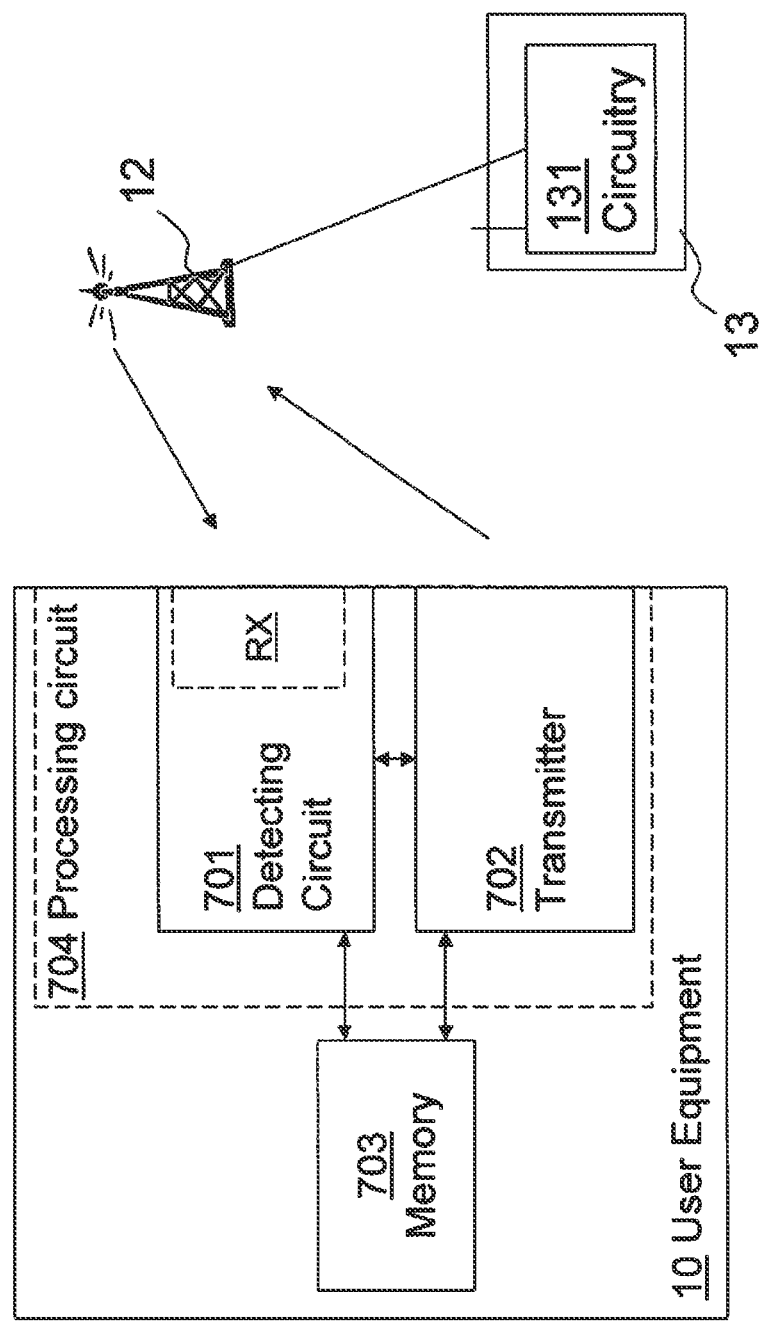
FIG. 7 is a block diagram depicting a user equipment.

In order to perform the method for handling radio link failure in the radio communications network, a user equipment is provided. FIG. 7 is a block diagram depicting the user equipment 10. The user equipment 10 is served in a first cell 14 controlled by the radio base station 12.

The user equipment 10 comprises a detecting circuit 701 configured to detect a first indication of a failure of the radio link between the user equipment 10 and the radio base station 12.

The detecting circuit 701 may further be configured to track a channel quality of the radio link and to determine whether the channel quality exceeds an upper threshold value and/or is below a lower threshold value. The detecting circuit 701 may then monitor a traffic activity over the radio link when the tracked channel quality exceeds the upper threshold value and/or is below the lower threshold value. The detecting circuit 701 may then, when traffic activity falls below an activity threshold and there is data buffered or protocol activity in the user equipment 10 for the radio base station 12, determine that the first indication of a failure of the radio link is detected.

The detecting circuit 701 may further be configured to trace a time between receiving or transmitting a first scheduling message, and receiving or transmitting a second scheduling message. For example, a time between receiving a DL scheduling grant and transmitting of an acknowledgement of the received scheduling grant.

In some embodiments, the detecting circuit 701 may further be configured to track a channel quality of the radio link; and to determine, based merely on the channel quality, that the first indication of a failure is detected when the tracked channel quality exceeds an upper threshold value and/or is below a lower threshold value.

The user equipment further comprises a transmitter 702 configured to transmit a second indication of a radio link failure when the first indication of a failure is detected. The second indication may be used as a trigger to forward a user equipment context of the user equipment 10 to a circuitry 131 controlling a second cell 16. The circuitry 131 may comprise hardware and/or software within a radio base station configured to provide radio coverage over the second cell 16. It should here be noted that the radio base station 12 may serve the first cell 14 as well as the second cell 16 and comprise the circuitry 131 that controls the second cell 16.

The user equipment context enables the circuitry 131 controlling the second cell 16 to serve the user equipment 10 wherein the user equipment context is used when establishing the connection in the radio communications network.

In some embodiments, the detecting circuit 701 may further be configured to compare the traced time with a first time threshold T1. The transmitter 702 may then be configured to transmit the second indication when the traced time exceeds the first time threshold T1. The first time threshold T1 may comprise an average time between previous consecutive received scheduling messages or previous consecutive transmitted scheduling messages, and a time offset.

Alternatively or additionally, the detecting circuit 701 may in some embodiments be configured to store a clock time of the radio communications network at a memory 703 of the user equipment 10. The detecting circuit 701 may then be configured to detect a third indication of synchronisation that the user equipment 10 is out of synchronization with the radio communications network. The second indication of radio link failure to be transmitted to the radio base station 12 may then comprise a random access channel request transmitted as the user equipment 10 detects the third indication of synchronisation that the user equipment 10 is out of synchronization. The second indication may then be transmitted by using the stored clock time.

The memory 703 may comprise one or more memory units and may be used to store for example data such as threshold values, quality values, timers, application to perform the methods herein when being executed on the user equipment 10 or similar.

The embodiments herein for handling radio link failure in a radio communications network may be implemented through one or more processors, such as a processing circuit 704 in the user equipment 10 depicted in FIG. 7, together with computer program code for performing the functions and/or method steps of the embodiments herein. The program code mentioned above may also be provided as a computer program product, for instance in the form of a data carrier carrying computer program code for performing the present solution when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

Figure 8:
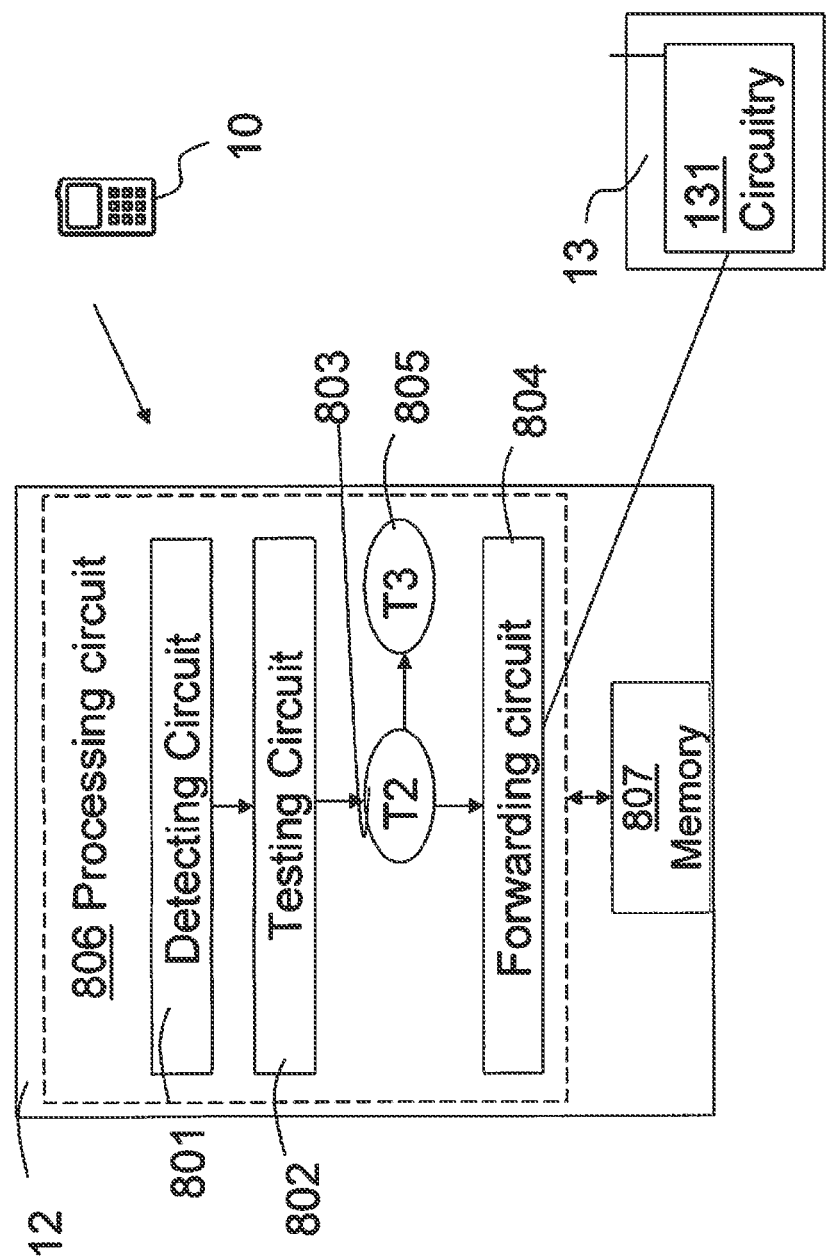
FIG. 8 is a block diagram depicting a radio base station.

FIG. 8 is a block diagram of the radio base station 12 receiving the second indication from the user equipment 10. The user equipment 10 is served in the first cell 14 controlled by the radio base station 12.

The radio base station 12 comprises a detecting circuit 801 configured to receive the second indication from the user equipment 10. The detecting circuit 801 is configured to detect a failure of the radio link between the user equipment 10 and the radio base station 12 by receiving the second indication from the user equipment indicating a radio link failure detected at the user equipment 10.

The detecting circuit 801 comprises a testing circuit 802 configured to test the radio link by transmitting a message to the user equipment 10 and to compare whether a response is received from the user equipment 10 within a second time value T2 of a second timer 803 comprising the second time value T2.

The radio base station 12 comprises a forwarding circuit 804 and if the second time value T2 expires the failure is detected, the forwarding circuit 802 is configured to forward a user equipment context of the user equipment 10 to a circuitry 131 controlling a second cell 16, e.g. for forwarding the user equipment context to circuitries controlling N neighbor cells.

The radio base station 12 may further comprise a store timer 805 during which means 805, the radio base station 12 may store the user equipment context in a memory 807 for T3 seconds. The radio base station 12 may also request for the ciphering keys of the N neighbor cells. The memory 807 may comprise one or more memory units and may be used to store for example data such as threshold values, quality values, user equipment context, timers, ciphering keys, application to perform the methods herein when being executed on the radio base station 12 or similar.

The embodiments herein for enabling the user equipment 10 to establish a connection in a radio communications network may be implemented through one or more processors, such as a processing circuit 806 in the radio base station 12 depicted in FIG. 8, together with computer program code for performing the functions and/or method steps of the embodiments herein. The program code mentioned above may also be provided as a computer program product, for instance in the form of a data carrier carrying computer program code for performing the present solution when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

Figure 9:
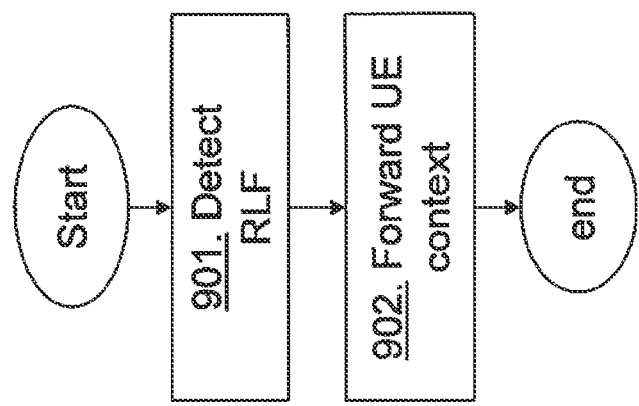
FIG. 9 is a schematic flowchart of a method in a radio base station.

The method steps in the radio base station 12 for enabling the user equipment 10 to establish a connection in the radio communications network according to some general embodiments will now be described with reference to a flowchart depicted in FIG. 9. The steps do not have to be taken in the order stated below, but may be taken in any suitable order. The user equipment 10 is served in the first cell 14) controlled by the radio base station 12 and the radio base station 12 is comprised in the radio communications network.

Step 901 The radio base station 12 detects a failure of the radio link between the user equipment 10 and the radio base station 12 by receiving the second indication from the user equipment 10. The second indication indicates a radio link failure detected at the user equipment 10. The radio base station 12 detects the failure by testing the radio link by transmitting a message to the user equipment. The radio base station 12 then compares whether a response is received from the user equipment 10 within a second time value T2, and if the second time value expires T2 the failure is detected.

Step 902. The radio base station 12 forwards a user equipment context of the user equipment 10 to a circuitry controlling a second cell 16 when the failure is detected. The user equipment context enables the circuitry controlling the second cell 16 to serve the user equipment 10 enabling the user equipment 10 to establish the connection in the radio communications network. The circuitry may comprise hardware and/or software within the radio base station 12 or another radio base station configured to provide radio coverage over the second cell 16.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the invention being defined by the following claims.

What is claimed is:

1. A method in a user equipment for handling a radio link failure in a radio communications network, the user equipment served in a first cell controlled by a radio base station in the radio communications network, wherein the method comprises:
    detecting a first indication of a failure of a radio link between the user equipment and the radio base station, by
        tracking a channel quality of the radio link;
        determining at least one of whether the channel quality exceeds an upper threshold value and whether the channel quality is below a lower threshold value;
        monitoring the activity of traffic over the radio link when at least one of the tracked channel quality exceeds the upper threshold value and the tracked channel quality is below the lower threshold value; and
        determining that the first indication of a failure is detected when the monitored activity falls below an activity threshold, and there is data buffered or protocol activity in the user equipment for the radio base station; and
    transmitting a second indication of radio link failure to the radio base station when the first indication of a failure is detected.

2. A method according to claim 1, wherein said monitoring comprises tracing a time between receiving or transmitting a first scheduling message and respectively receiving or transmitting a second scheduling message.

3. A method according to claim 2, wherein determining that the first indication of a failure is detected comprises comparing the traced time with a first time threshold, and wherein transmitting said second indication comprises transmitting the second indication when the traced time exceeds the first time threshold.

4. A method according to claim 3, wherein the first time threshold comprises an average time between previous consecutive received scheduling messages or previous consecutive transmitted scheduling messages, plus a time offset.

5. A method according to claim 1:
    wherein said detecting of the first indication comprises:
        storing a clock time of the radio communications network; and
        detecting the first indication responsive to receiving a third indication that the user equipment is out of synchronization with the radio communications network; and
    wherein transmitting the second indication comprises transmitting the second indication, upon detecting the third indication and using the stored clock time, as a request over a random access channel.

6. A user equipment for handling a radio link failure in a radio communications network, the user equipment served in a first cell controlled by a radio base station in the radio communications network, wherein the user equipment comprises:
    a detecting circuit configured to detect a first indication of a failure of a radio link between the user equipment and the radio base station, by
        tracking a channel quality of the radio link;
        determining at least one of whether the channel quality exceeds an upper threshold value and whether the channel quality is below a lower threshold value;
        monitoring a traffic activity over the radio link when at least one of the tracked channel quality exceeds the upper threshold value and the tracked channel quality is below the lower threshold value; and
        determining that the first indication of a failure is detected when traffic activity falls below an activity threshold, and there is data buffered or protocol activity in the user equipment for the radio base station; and a transmitter configured to transmit a second indication of a radio link failure to the radio base station when the first indication is detected.

7. A user equipment according to claim 6, wherein the detecting circuit is further configured to trace a time between receiving or transmitting a first scheduling message and receiving or transmitting a second scheduling message.

8. A user equipment according to claim 7, wherein the detecting circuit is further configured to compare the traced time with a first time threshold, and wherein the transmitter is configured to transmit the second indication when the traced time exceeds the first time threshold.

9. A user equipment according to claim 8, wherein the first time threshold comprises an average time between previous consecutive received scheduling messages or previous consecutive transmitted scheduling messages, plus a time offset.

10. A user equipment according to claim 6, wherein the detecting circuit is further configured to store a clock time of the radio communications network in a memory of the user equipment, and to detect the first indication responsive to receiving a third indication that the user equipment is out of synchronization with the radio communications network, and wherein the transmitter is configured to transmit the second indication, upon detecting the third indication and using the stored clock time, as a random access channel request.

11. A radio base station for enabling a user equipment to establish a connection in a radio communications network, the user equipment served in a first cell controlled by the radio base station, wherein the radio base station comprises:

a detecting circuit comprising a testing circuit and configured to detect a failure of a radio link between the user equipment and the radio base station by:

receiving an indication from the user equipment that indicates the user equipment detected a radio link failure, responsive to receiving said indication testing the radio link at the testing circuit by transmitting a message to the user equipment and determining whether a response is received from the user equipment within a predetermined time, and detecting said failure if the predetermined time expires before receiving said response; and a forwarding circuit configured to forward a user equipment context of the user equipment to a circuitry controlling a second cell when the failure is detected, said user equipment context enabling the circuitry controlling the second cell to serve the user equipment and thereby enabling the user equipment to establish the connection in the radio communications network.

12. The radio base station of claim 11, wherein the detecting circuit is configured to transmit an out of synchronization indication to the user equipment indicating that the user equipment is out of synchronization with the radio communications network, and to receive an indication from the user equipment indicating that the user equipment detected a radio link failure by receiving a request over a random access channel that is out of synchronization from a clock in the radio base station.

13. A method in a radio base station for enabling a user equipment to establish a connection in a radio communications network, the user equipment served in a first cell controlled by the radio base station, the radio base station comprised in the radio communications network, and wherein the method comprises detecting a failure of a radio link between the user equipment and the radio base station by: receiving an indication from the user equipment indicating that the user equipment detected a radio link failure;

responsive to receiving said indication testing the radio link by transmitting a message to the user equipment and determining whether a response is received from the user equipment within a predetermined time; and detecting said failure if the predetermined time expires before receiving said response; and forwarding a user equipment context of the user equipment to a circuitry controlling a second cell when the failure is detected, said user equipment context enabling the circuitry controlling the second cell to serve the user equipment and thereby enabling the user equipment to establish the connection in the radio communications network.

14. The method of claim 13, wherein the method further comprises transmitting an out of synchronization indication to the user equipment indicating that the user equipment is out of synchronization with the radio communications network, and wherein receiving an indication from the user equipment indicating that the user equipment detected a radio link failure comprises receiving a request over a random access channel that is out of synchronization from a clock in the radio base station.

* * * * *